(12) United States Patent
Taniguchi et al.

(10) Patent No.: US 10,441,936 B2
(45) Date of Patent: Oct. 15, 2019

(54) LIQUID CRYSTAL CAPSULE AND METHOD FOR PRODUCING THE SAME

(71) Applicants: JNC CORPORATION, Tokyo (JP); JNC PETROCHEMICAL CORPORATION, Tokyo (JP); NATIONAL UNIVERSITY CORPORATION CHIBA UNIVERSITY, Chiba (JP)

(72) Inventors: Tatsuo Taniguchi, Chiba (JP); Sho Hidaka, Chiba (JP); Eiji Okabe, Chiba (JP); Fumitaka Kondo, Chiba (JP)

(73) Assignees: JNC CORPORATION, Tokyo (JP); JNC PETROCHEMICAL CORPORATION, Tokyo (JP); NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 0 days.

(21) Appl. No.: 15/506,251

(22) PCT Filed: Jul. 10, 2015

(86) PCT No.: PCT/JP2015/069882
§ 371 (c)(1),
(2) Date: Feb. 24, 2017

(87) PCT Pub. No.: WO2016/035453
PCT Pub. Date: Mar. 10, 2016

(65) Prior Publication Data
US 2017/0246608 A1   Aug. 31, 2017

(30) Foreign Application Priority Data

Sep. 2, 2014 (JP) ................................. 2014-177596

(51) Int. Cl.

| | | |
|---|---|---|
| *G02F 1/1333* | (2006.01) | |
| *B01J 13/18* | (2006.01) | |
| *B01J 13/08* | (2006.01) | |
| *C09K 19/30* | (2006.01) | |
| *C09K 19/54* | (2006.01) | |
| *G02F 1/1335* | (2006.01) | |
| *B01J 13/14* | (2006.01) | |
| *C09B 67/02* | (2006.01) | |
| *C09K 19/04* | (2006.01) | |
| *C09K 19/18* | (2006.01) | |
| *C09K 19/20* | (2006.01) | |

(52) U.S. Cl.
CPC .............. *B01J 13/18* (2013.01); *B01J 13/08* (2013.01); *B01J 13/14* (2013.01); *C09B 67/0097* (2013.01); *C09K 19/3001* (2013.01); *C09K 19/3028* (2013.01); *C09K 19/3059* (2013.01); *C09K 19/3066* (2013.01); *C09K 19/544* (2013.01); *G02F 1/133528* (2013.01); *C09K 2019/0466* (2013.01); *C09K 2019/181* (2013.01); *C09K 2019/2035* (2013.01); *C09K 2019/3004* (2013.01); *C09K 2019/3016* (2013.01); *C09K 2019/3019* (2013.01); *C09K 2019/3063* (2013.01); *C09K 2219/00* (2013.01)

(58) Field of Classification Search
CPC ............ C09K 19/3001; C09K 19/3059; C09K 19/3066; C09K 19/544; C09K 19/3028; C09K 2019/0466; C09K 2019/3063; C09K 2019/181; C09K 2019/2035; C09K 2019/3004; C09K 2019/3016; C09K 2019/3019; C09K 2219/00; G02F 1/1333; G02F 1/133528; B01J 13/08; B01J 13/18; B01J 13/14; C09B 67/0097
USPC ..................................................... 252/299.01
See application file for complete search history.

(56) References Cited

U.S. PATENT DOCUMENTS

| | | |
|---|---|---|
| 6,067,135 A | 5/2000 | Shimizu et al. |
| 6,266,109 B1 | 7/2001 | Yamaguchi et al. |

FOREIGN PATENT DOCUMENTS

| | | |
|---|---|---|
| JP | H08-067878 | 3/1996 |
| JP | H09-236791 | 9/1997 |
| JP | H11-183937 | 7/1999 |
| JP | 2009-181040 | 8/2009 |

(Continued)

OTHER PUBLICATIONS

Kang et al., "Optically-isotropic nanoencapsulated liquid crystal displays based on Kerr effect", Optics Express, Jun. 24, 2013, pp. 15719-15727.

(Continued)

*Primary Examiner* — Geraldina Visconti
(74) *Attorney, Agent, or Firm* — JCIPRNET

(57) ABSTRACT

Shown is a method for producing a liquid crystal capsule having a particle diameter of 30 to 150 nanometers, and a method for producing a liquid crystal capsule without using a homogenizer. The disclosure concerns a method for producing a liquid crystal capsule, including a step of preparing an emulsion by performing phase inversion emulsification of a mixed material obtained by mixing a liquid crystal composition, a monomer, a surfactant, and a polymerization initiator; and a step of producing a liquid crystal capsule by applying a coacervation method to the emulsion. The disclosure also concerns a liquid crystal capsule having a liquid crystal composition, a surfactant and a capsule wall, wherein the capsule wall has a closed curved shape, the liquid crystal composition and a hydrophobic moiety of the surfactant are arranged inside the capsule wall, and a hydrophilic moiety of the surfactant is arranged outside the capsule wall.

7 Claims, 1 Drawing Sheet

(56) References Cited

FOREIGN PATENT DOCUMENTS

JP            2010-211182         9/2010

OTHER PUBLICATIONS

"International Search Report (Form PCT/ISA/210) of PCT/JP2015/069882", with English translation thereof, dated Oct. 6, 2015, pp. 1-2.

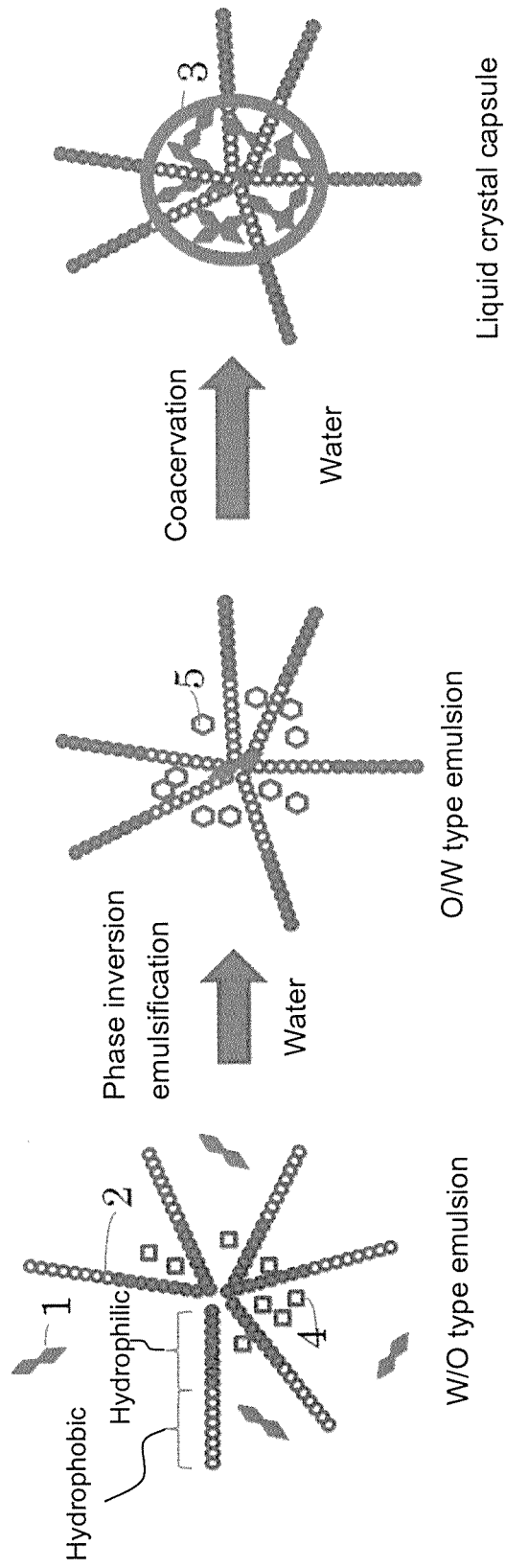

LIQUID CRYSTAL CAPSULE AND METHOD FOR PRODUCING THE SAME

CROSS-REFERENCE TO RELATED APPLICATION

This application is a 371 application of the international PCT application serial no. PCT/JP2015/069882, filed on Jul. 10, 2015, which claims the priority benefit of Japan application no. 2014-177596, filed on Sep. 2, 2014. The entirety of each of the abovementioned patent applications is hereby incorporated by reference herein and made a part of this specification.

TECHNICAL FIELD

The invention relates to a liquid crystal capsule and a method for producing the same.

BACKGROUND ART

A liquid crystal capsule having a structure in which a liquid crystal composition is contained in a hollow part of a capsule has been used as a liquid crystal display device, and use in a flexible display is particularly expected (for example, Patent literature Nos. 1 and 2, and Non-patent literature No. 1).

Specifically, a liquid crystal display device is known in which a mixture containing the liquid crystal capsule and a binder (resin) is applied onto a comb-type (transverse electric field) substrate by using a bar coater or the like, and the device is driven only by a single-sided substrate. Such a liquid crystal display device is driven by using Kerr effect.

When the liquid crystal capsule is used in such a liquid crystal display device driven only by the single-sided substrate, if a particle diameter of the liquid crystal capsule exceeds about 150 nanometers, scattering of visible light is increased, resulting in difficulty in displaying black.

CITATION LIST

Patent Literature

Patent literature No. 1: JP H8-67878 A
Patent literature No. 2: JP 2010-211182 A

Non-Patent Literature

Non-patent literature No. 1: Optics EXPRESS Vol. 21, No. 13, pp. 15719 to 15727 (1 Jul. 2013)

SUMMARY OF INVENTION

Technical Problem

Under the circumstances described above, a method for producing a liquid crystal capsule having a particle diameter of 30 to 150 nanometers is required. Moreover, a method for producing the liquid crystal capsule without using a homogenizer is required.

Solution to Problem

The present inventors have completed the invention of a method for producing a liquid crystal capsule, the method having a step of preparing an emulsion by mixing a liquid crystal composition (composition containing a liquid crystal material composed of one or two or more liquid crystal components), a monomer, a surfactant, and a polymerization initiator, and performing phase inversion emulsification thereon, and a step of producing the liquid crystal capsule by applying a coacervation method to the emulsion.

The invention includes the following aspects, for example.

Item 1. A production method for a liquid crystal capsule, including:

a step of preparing an emulsion by performing phase inversion emulsification on a mixed material obtained by mixing a liquid crystal composition, a monomer, a surfactant, and a polymerization initiator; and a step of producing the liquid crystal capsule by applying a coacervation method to the emulsion.

Item 2. The production method according to item 1, wherein the surfactant is a block copolymer.

Item 3. The production method according to item 1 or 2, wherein interfacial tension $\gamma$ in the liquid crystal composition, a polymer obtained from the monomer, and water satisfies the following three expressions (a) to (c):

$$\gamma_{23}-(\gamma_{12}+\gamma_{13})<0 \tag{a}$$

$$\gamma_{13}-(\gamma_{12}+\gamma_{23})>0 \tag{b; and}$$

$$\gamma_{12}-(\gamma_{13}+\gamma_{23})<0 \tag{c},$$

where, in expressions (a) to (c), subscript 1 represents a liquid crystal composition, subscript 2 represents a polymer, subscript 3 represents water, and $\gamma_{12}$, $\gamma_{13}$ and $\gamma_{23}$ are represented by the following expressions:

$$\gamma_{12}=\gamma_1+\gamma_2-2(\gamma_1^d\gamma_2^d)^{1/2}-2(\gamma_1^h\gamma_2^h)^{1/2};$$

$$\gamma_{13}=\gamma_1+\gamma_3-2(\gamma_1^d\gamma_3^d)^{1/2}-2(\gamma_1^h\gamma_3^h)^{1/2}; \text{ and}$$

$$\gamma_{23}=\gamma_2+\gamma_3-2(\gamma_2^d\gamma_3^d)^{1/2}-2(\gamma_2^h\gamma_3^h)^{1/2},$$

where, $\gamma$ satisfies the equation: $\gamma=\gamma^d+\gamma^h$, subscript d represents a non-polar dispersion force component, and subscript h represents a polar hydrogen bonding component.

Item 4. The production method according to any one of items 1 to 3, wherein the liquid crystal composition contains liquid crystal component 1 composed of a compound represented by formula (1), and liquid crystal component 2 composed of a compound represented by formula (2), in which a proportion of a compound having cyano is less than 3% by weight based on the total of the liquid crystal compositions:

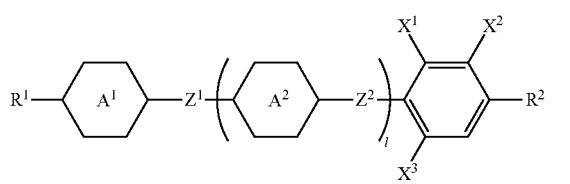

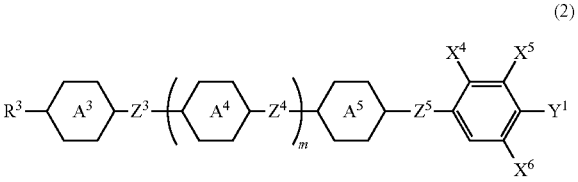

wherein, in formula (l) and formula (2), $R^1$, $R^2$ and $R^3$ are independently alkyl having 1 to 12 carbons, alkoxy having 1 to 12 carbons or alkenyl having 2 to 12 carbons; rings $A^1$, $A^2$, $A^3$, $A^4$ and $A^5$ are independently 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; $Z^1$, $Z^2$, $Z^3$, $Z^4$ and $Z^5$ are independently a single bond, ethylene, vinylene, methyleneoxy, carbonyloxy, difluoromethyleneoxy, tolan or tetrafluoroethylene, in which at least one of $Z^1$ and $Z^2$ is tolan; $X^1$, $X^2$, $X^3$, $X^4$, $X^5$ and $X^6$ are independently hydrogen or fluorine, in which a case where $X^1$ and $X^2$ are simultaneously fluorine is excluded, and a case where $X^4$ and $X^5$ are simultaneously fluorine is excluded; $Y^1$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; l and m are 0, 1 or 2, and when l and m represent 2, a plurality of ring $A^2$, ring $A^4$, $Z^2$ and $Z^4$ existing therein may be identical to or different from each other.

Item 4-1. The liquid crystal capsule according to item 4, wherein liquid crystal component 1 is preferably composed of a compound represented by formula (1-1), and liquid crystal component 2 is preferably composed of a compound represented by formula (2-1).

Item 4-2. The liquid crystal capsule according to item 4, wherein a proportion of liquid crystal component 1 is preferably in the range of 20 to 70% by weight, and a proportion of liquid crystal component 2 is preferably in the range of 25 to 75% by weight, based on the weight of the liquid crystal composition.

Item 5. A liquid crystal capsule, produced by the production method according to any one of items 1 to 4.

Item 6. The liquid crystal capsule according to item 5, wherein a diameter of the liquid crystal capsule is 30 to 150 nanometers.

Item 7. A liquid crystal capsule having a liquid crystal composition, a surfactant and a capsule wall, wherein the capsule wall has a closed curved shape, the liquid crystal composition and a hydrophobic moiety of the surfactant are arranged inside the capsule wall, and a hydrophilic moiety of the surfactant is arranged outside the capsule wall.

Item 8. The liquid crystal composition according to item 7, wherein the liquid crystal composition contains liquid crystal component 1 composed of a compound represented by formula (1), and liquid crystal component 2 composed of a compound represented by formula (2), in which a proportion of a compound having cyano is less than 3% by weight based on the total of the liquid crystal composition:

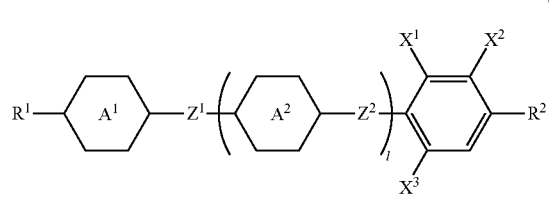

(1)

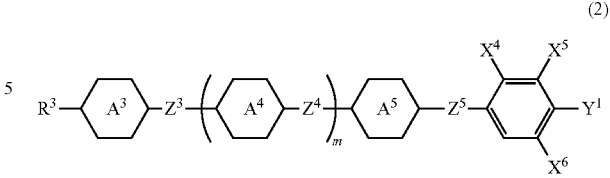

(2)

wherein, in formula (1) and formula (2), $R^1$, $R^2$ and $R^3$ are independently alkyl having 1 to 12 carbons, alkoxy having 1 to 12 carbons or alkenyl having 2 to 12 carbons; rings $A^1$, $A^2$, $A^3$, $A^4$ and $A^5$ are independently 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; $Z^1$, $Z^2$, $Z^3$, $Z^4$ and $Z^5$ are independently a single bond, ethylene, vinylene, methyleneoxy, carbonyloxy, difluoromethyleneoxy, tolan or tetrafluoroethylene, in which at least one of $Z^1$ and $Z^2$ is tolan; $X^3$, $X^4$, $X^5$ and $X^6$ are independently hydrogen or fluorine, in which a case where $X^1$ and $X^2$ are simultaneously fluorine is excluded, and a case where $X^4$ and $X^5$ are simultaneously fluorine is excluded; $Y^1$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and l and m are 0, 1 or 2, and when l and m represent 2, a plurality of ring $A^2$, ring $A^4$, $Z^2$ and $Z^4$ existing therein may be identical to or different from each other.

Item 9. The liquid crystal capsule according to item 8, wherein liquid crystal component 1 is a compound represented by formula (1-1), and liquid crystal component 2 is a compound represented by formula (2-1):

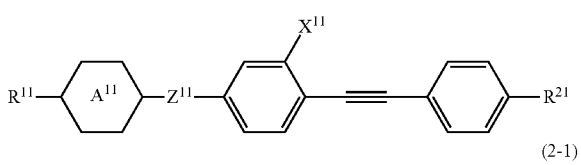

(1-1)

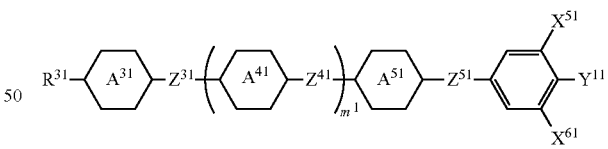

(2-1)

wherein, in formula (1-1) and formula (2-1), $R^{11}$, $R^{21}$ and $R^{31}$ are independently alkyl having 1 to 12 carbons, alkoxy having 1 to 12 carbons or alkenyl having 2 to 12 carbons; ring $A^{11}$ is 1,4-cyclohexylene, 1,4-phenylene, 2-fluoro-1,4-phenylene, 2,5-difluoro-1,4-phenylene or 2,6-difluoro-1,4-phenylene; ring $A^{31}$ is 1,4-phenylene, 2-fluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; ring $A^{41}$ and ring $A^{51}$ are independently 1,4-phenylene, 2-fluoro-1,4-phenylene or 2,6-difluoro-1,4-phenylene; $Z^{11}$, $Z^{31}$, $Z^{41}$ and $Z^{51}$ are independently a single bond, ethylene, vinyl ene, methyleneoxy, carbonyloxy, difluoromethyleneoxy, tolan or tetrafluoroethylene, in which at least one of $Z^{31}$, $Z^{41}$ and $Z^{51}$ is difluoromethyleneoxy; $X^{11}$, $X^{51}$ and $X^{61}$ are independently hydrogen or fluorine; $Y^{11}$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and $m^1$ is 0, 1 or 2, and when $m^1$ represents 2, a plurality of ring $A^{41}$ and $Z^{41}$ existing therein may be identical to or different from each other.

Item 10. The liquid crystal capsule according to item 8 or 9, wherein a proportion of liquid crystal component 1 is in the range of 20 to 70% by weight, and a proportion of liquid crystal component 2 is in the range of 25 to 75% by weight, based on the weight of the liquid crystal composition.

Item 11. The liquid crystal capsule according to any one of items 7 to 10, wherein a diameter of the liquid crystal capsule is 30 to 150 nanometers.

Item 12. The liquid crystal capsule according to any one of items 7 to 11, wherein the liquid crystal composition contains an optically active compound.

Item 13. The liquid crystal capsule according to any one of items 7 to 11, wherein the liquid crystal composition further contains one or more materials selected from the group of an optically active compound, an antioxidant, and an ultraviolet light absorber.

Item 14. A liquid crystal device, having a substrate, an electrode formed on the substrate, the liquid crystal capsule according to any one of items 5 to 13, and an electric field application means for applying an electric field to the liquid crystal capsule through the electrode.

Item 15. The liquid crystal device according to item 14, wherein at least one substrate is transparent, and the liquid crystal device has a polarizing plate arranged outside the substrate.

"Liquid crystal material" herein means a material composed of one or two or more liquid crystal components (liquid crystal compounds), and "liquid crystal composition" means a composition containing the liquid crystal material, and an additive (an optically active compound, an antioxidant, an ultraviolet light absorber, a dichroic dye or the like) as an arbitrary component.

Advantageous Effects of Invention

According to a method for producing a liquid crystal capsule in a preferred aspect of the invention, a liquid crystal capsule having a particle diameter of 30 to 150 nanometers can be produced. Moreover, according to a production method in a preferred aspect of the invention, the liquid crystal capsule can be produced without using a homogenizer.

BRIEF DESCRIPTION OF DRAWINGS

FIG. 1 is a schematic view of a production method according to the invention.

DESCRIPTION OF EMBODIMENTS

1 Liquid Crystal Capsule

A liquid crystal capsule according to the invention contains liquid crystal composition 1 containing a liquid crystal material, surfactant 2 and capsule wall 3. Specifically, as shown in FIG. 1, capsule wall 3 has a closed curved shape, and liquid crystal composition 1 is arranged inside capsule wall 3. Moreover, a hydrophobic moiety of surfactant 2 is further arranged inside capsule wall 3, and a hydrophilic moiety of surfactant 2 is arranged outside capsule wall 3. Specific examples of the closed curved shape include a spherical surface and an elliptic spherical surface. A composition of capsule wall 3 is not particularly limited, and is preferably a polymer.

The liquid crystal material is a material composed of one or two or more liquid crystal components (liquid crystal compounds). Moreover, surfactant 2 may be one compound or may be composed of a plurality of compounds.

A content of the surfactant is preferably 1 to 50% by weight, and further preferably 1 to 35% by weight, based on the weight of the liquid crystal capsule. A content of the capsule wall is preferably 10 to 80% by weight, and further preferably 20 to 60% by weight, based on the weight of the liquid crystal capsule.

From a viewpoint of display quality, an average particle diameter of the liquid crystal capsule is preferably 30 to 150 nanometers, and further preferably 30 to 100 nanometers. Moreover, "average particle diameter" herein means an average of diameters of the capsule walls obtained by measuring the diameters by cumulative operation of 50 times at 25° C. according to a light scattering method. A particle diameter herein means a diameter calculated from a volume distribution.

A liquid crystal composition can be used as a composition having a nematic phase, and as an optically active composition by adding an optically active compound thereto.

In general, the liquid crystal capsule obtained is in a state in which the capsule is dispersed in water, but is used in a solution state in which a binder material and the like are added thereto. Moreover, the binder material may be one or two or more. As the binder material, a water-soluble compound such as PVA poly(vinyl alcohol) and poly(vinyl pyrrolidone) can be used. If a state in which contents in the liquid crystal capsule are not leaked is kept, solvent substitution can be made for water being a dispersion liquid, and a compound soluble in the solvent subjected to the substitution can also be used as the binder material. Further, the binder material can be subjected to reaction in a subsequent step.

2 Method for Producing a Liquid Crystal Capsule

A method for producing a liquid crystal capsule according to the invention includes: step A of preparing an emulsion by performing phase inversion emulsification of a mixed material containing a liquid crystal composition (1), a monomer (2), a surfactant (3) and a polymerization initiator (4); and step B of producing a liquid crystal capsule by applying a coacervation method to the emulsion.

2.1 Preparation Step for Emulsion by Applying Phase Inversion Emulsification (Step A)

A mixed material containing a liquid crystal composition (1), a monomer (2), a surfactant (3) and a polymerization initiator (4) is arranged. In the mixed material, the liquid crystal composition (1), the monomer (2), the surfactant (3) and the polymerization initiator (4) are dispersed thereinto, and with regard to the surfactant being a block copolymer, a hydrophobic group is oriented outward, and a hydrophilic moiety is oriented inward, more specifically, a water-in-oil emulsion (W/O type emulsion) is formed (see FIG. 1).

Next, if water is added to the mixed material, phase inversion emulsification from an oil phase to a water phase is caused, and an oil-in-water emulsion (O/W type emulsion) is formed (see FIG. 1).

In the following, the liquid crystal composition (1), the monomer (2), the surfactant (3) and the polymerization initiator (4) contained in the mixed material will be described.

2.1.1 Liquid Crystal Composition

The liquid crystal composition contains the liquid crystal material, and further may arbitrarily contain an additive such as an optically active compound, an antioxidant, an ultraviolet light absorber and a dichroic dye.

The liquid crystal composition mainly has a minimum temperature of about −10° C. or lower and a maximum temperature of about 70° C. or higher with regard to a transition temperature from a nematic phase to a crystal, and optical anisotropy in the range of about 0.20 to about 0.35. A device including the liquid crystal composition has a large voltage holding ratio. The composition is suitable for an AM device, and particularly suitable for a transmissive AM device.

(1) Liquid Crystal Material Contained in the Liquid Crystal Composition

The liquid crystal material is not particularly limited, if a material containing a liquid crystal component exhibiting liquid crystallinity is applied. Moreover, specific examples of the liquid crystal composition containing the liquid crystal material include a nematic liquid crystal, a smectic liquid crystal, a cholesteric liquid crystal and a chiral nematic liquid crystal. Among the liquid crystal compositions, a nematic liquid crystal is preferred.

The liquid crystal material preferably contains compounds having different characteristics. Specifically, the following liquid crystal components 1 to 3 each having predetermined characteristics for the maximum temperature of the transition temperature from the nematic phase to an isotropic phase, viscosity, the optical anisotropy, dielectric anisotropy, specific resistance and the like are preferably used.

Table 1

TABLE 1

Table 1 Characteristics of Liquid Crystal Component

|  | Liquid Crystal Component | | |
| --- | --- | --- | --- |
|  | Liquid Crystal Component 1 | Liquid Crystal Component 2 | Liquid Crystal Component 3 |
| Maximum temperature | M to L | M to L | S to L |
| Viscosity | M | M to L | S to M |
| Optical anisotropy | L | M to L | L |
| Dielectric anisotropy | 0 | M to L | 0 |
| Specific resistance | L | L | L |

In Table 1, L stands for large or high, M stands for medium, and S stands for small or low. The symbols L, M, and S are classified based on qualitative comparison among component compounds, and 0 (zero) means that a value is zero or substantially zero.zero or substantially zero.

If liquid crystal component 1 is used, the liquid crystal composition shows a trend of a rise in the optical anisotropy thereof, and if liquid crystal component 2 is used, the liquid crystal composition shows a trend of rise in the dielectric anisotropy thereof. Moreover, if liquid crystal component 3 is used, the liquid crystal composition shows a trend of rise in the optical anisotropy thereof, a trend of rise in the maximum temperature of the transition temperature from the nematic phase to the isotropic phase, or a trend of fall in the minimum temperature of the transition temperature from the nematic phase to the crystal. Therefore, liquid crystal component 3 is preferably added in order to provide the liquid crystal composition with such characteristics.

The liquid crystal material preferably contains liquid crystal component 1, further preferably contains liquid crystal component 1 and liquid crystal component 2, and particularly preferably contains liquid crystal component 1, liquid crystal component 2 and liquid crystal component 3. In addition, liquid crystal components 1 to 3 each may be composed of a plurality of compounds.

In order to obtain successful optical anisotropy and successful dielectric anisotropy in the liquid crystal material, a content is preferably 20 to 70% by weight for liquid crystal component 1, 25 to 75% by weight for liquid crystal component 2, and 5 to 55% by weight for liquid crystal component 3, and a content is further preferably 30 to 65% by weight for liquid crystal component 1, 25 to 60% by weight for liquid crystal component 2, and 10 to 45% by weight for liquid crystal component 3.

A content of the liquid crystal material in the liquid crystal capsule according to the invention is preferably 10 to 95% by weight, and further preferably 30 to 95% by weight, based on the total amount of the liquid crystal capsule. If the liquid crystal material is within the range of an intensive quantity described above, sufficient liquid crystal performance is obtained, and simultaneously a relative thickness of the capsule wall becomes sufficient, and the wall becomes hard to break.

The liquid crystal composition contained in the liquid crystal capsule according to the invention preferably does not contain a compound having cyano as much as possible in view of high stability to ultraviolet light. A proportion of the compound having cyano is preferably less than 3% by weight, and further preferably less than 2% by weight, and still further preferably less than 1% by weight, based on the total of the liquid crystal composition.

Liquid Crystal Component 1

Liquid crystal component 1 is a compound represented by formula (1). Liquid crystal component 1 may be one compound or a combination of a plurality of compounds, if the compound represented by formula (1) is applied.

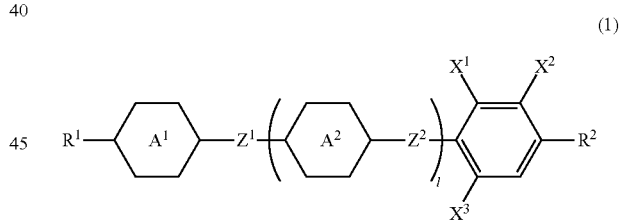
(1)

In formula (1), $R^1$ and $R^2$ are independently alkyl having 1 to 12 carbons, alkoxy having 1 to 12 carbons or alkenyl having 2 to 12 carbons; ring $A^1$ and $A^2$ are independently 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; $Z^1$ and $Z^2$ are independently a single bond, ethylene, vinylene, methyleneoxy, carbonyloxy, difluoromethyleneoxy, tolan or tetrafluoroethylene, in which at least one of $Z^1$ and $Z^2$ is tolan; $X^1$, $X^2$ and $X^3$ are independently hydrogen or fluorine, in which a case where $X^1$ and $X^2$ are simultaneously fluorine is excluded; and l is 0, 1 or 2, and when l represents 2, a plurality of ring $A^2$ and $Z^2$ existing therein may be identical to or different from each other.

Liquid crystal compound 1 is preferably a compound represented by formula (1-1) among the compounds represented by formula (1). Liquid crystal compound 1 is preferably each of compounds represented by formulas (1-1-1) to (1-1-13) among the compounds represented by formula (1-1).

(1-1)

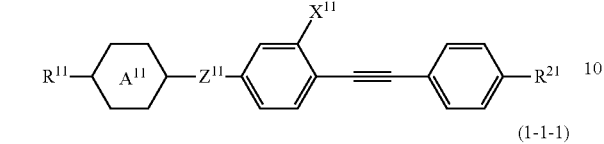

(1-1-1)

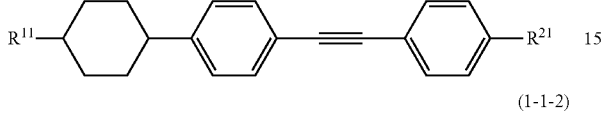

(1-1-2)

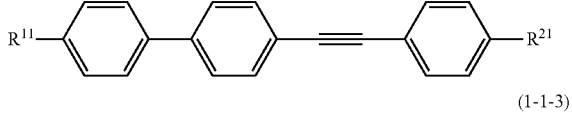

(1-1-3)

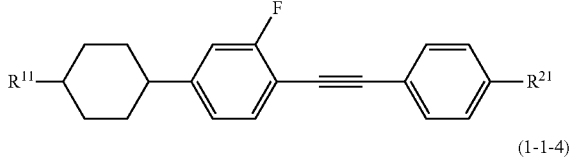

(1-1-4)

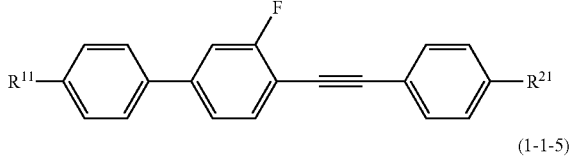

(1-1-5)

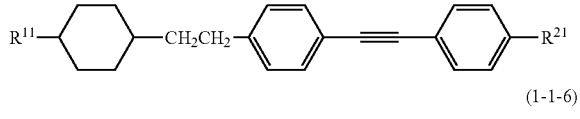

(1-1-6)

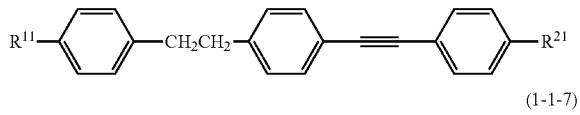

(1-1-7)

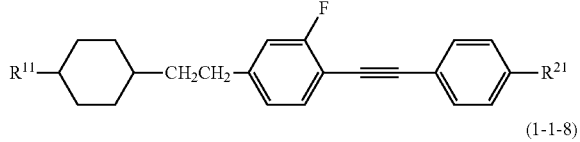

(1-1-8)

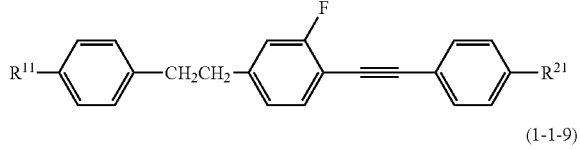

(1-1-9)

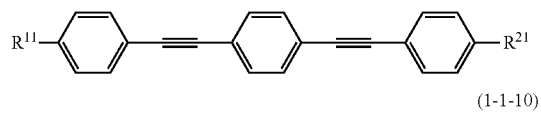

(1-1-10)

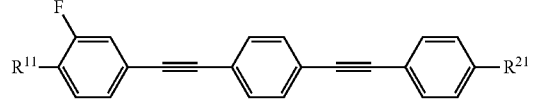

(1-1-11)

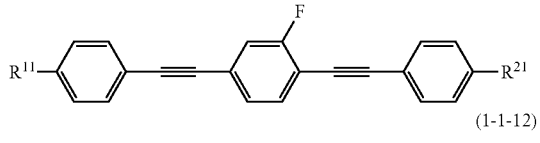

(1-1-12)

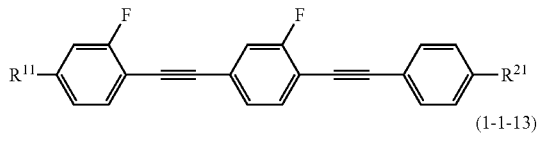

(1-1-13)

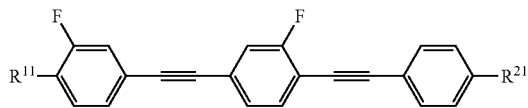

In formula (1-1) and formulas (1-1-1) to (1-1-13), $R^{11}$ and $R^{21}$ are independently alkyl having 1 to 12 carbons, alkoxy having 1 to 12 carbons or alkenyl having 2 to 12 carbons; ring $A^{11}$ is 1,4-cyclohexylene, 1,4-phenylene, 2-fluoro-1,4-phenylene, 2,5-difluoro-1,4-phenylene or 2,6-difluoro-1,4-phenylene; $Z^{11}$ is a single bond, ethylene, vinylene, methyleneoxy, carbonyloxy, difluoromethyleneoxy, tolan or tetrafluoroethylene; and $X^{11}$ is hydrogen or fluorine.

In order to increase the optical anisotropy of the compound, preferred $Z^{11}$ in formula (1-1) is a single bond or tolan, and preferred ring $A^{11}$ is 1,4-phenylene or 2-fluoro-1,4-phenylene.

At least one of liquid crystal components 1 is preferably a compound represented by formula (1-1-3), a compound represented by formula (1-1-4), or a compound represented by formula (1-1-5). Moreover, at least two of liquid crystal components 1 are preferably a combination of a compound represented by formula (1-1-3) and a compound represented by formula (1-1-5), or a combination of a compound represented by formula (1-1-4) and a compound represented by formula (1-1-5).

Liquid Crystal Component 2

Liquid crystal component 2 is a compound represented by formula (2). Liquid crystal component 2 may be one compound, or a combination of a plurality of compounds, if the compound represented by formula (2) is applied.

(2)

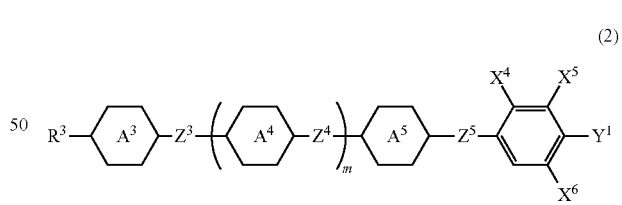

In formula (2), $R^3$ is alkyl having 1 to 12 carbons, alkoxy having 1 to 12 carbons or alkenyl having 2 to 12 carbons; rings $A^3$, $A^4$ and $A^5$ are independently 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; $Z^3$, $Z^4$ and $Z^5$ are independently a single bond, ethylene, vinylene, methyleneoxy, carbonyloxy, difluoromethyleneoxy, tolan or tetrafluoroethylene, and $X^4$, $X^5$ and $X^6$ are independently hydrogen or fluorine, in which a case where $X^4$ and $X^5$ are simultaneously fluorine is excluded; $Y^1$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and m is 0, 1 or 2, and when m represents 2, a plurality of ring $A^4$ and $Z^4$ existing therein are identical to or different from each other.

Specific examples of liquid crystal component 2 preferably include compounds represented by formulas (2-1) and (2-2) among the compounds represented by formula (2). Liquid crystal component 2 is preferably each of compounds represented by formulas (2-1-1) to (2-1-13) among the compounds represented by formula (2-1).

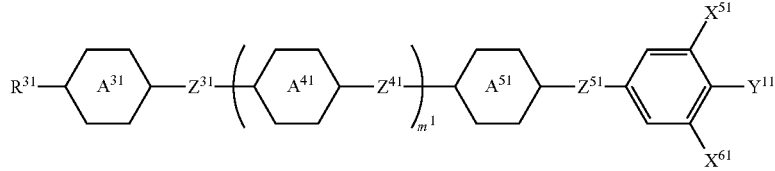
(2-1)

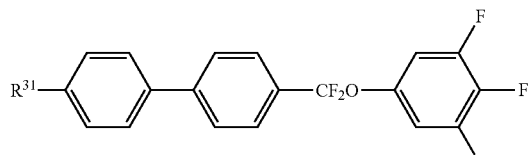
(2-1-1)

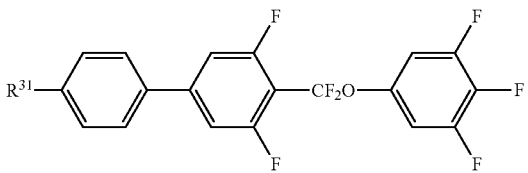
(2-1-2)

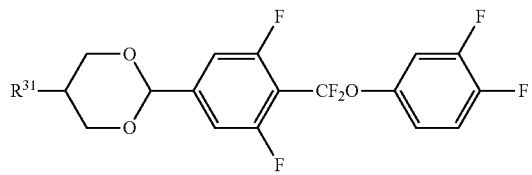
(2-1-3)

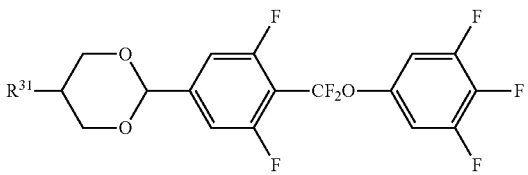
(2-1-4)

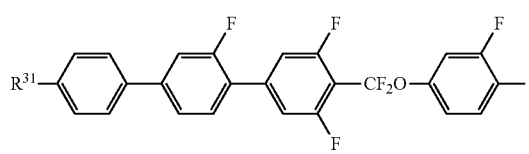
(2-1-5)

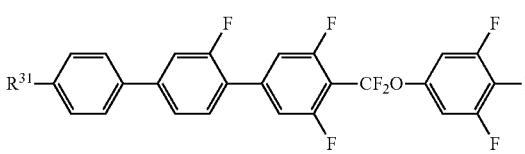
(2-1-6)

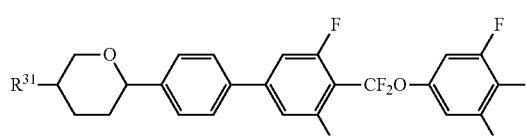
(2-1-7)

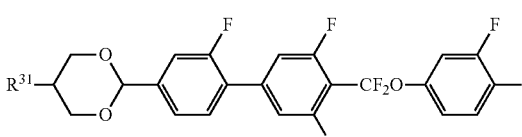
(2-1-8)

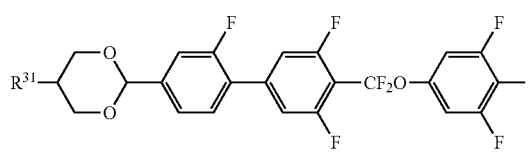
(2-1-9)

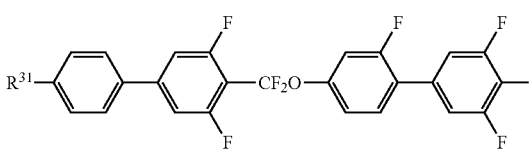
(2-1-10)

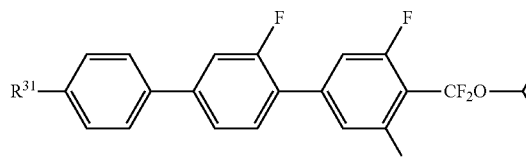
(2-1-11)

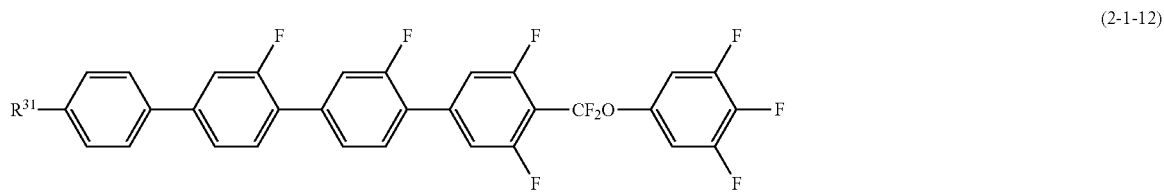
(2-1-12)

(2-1-13)

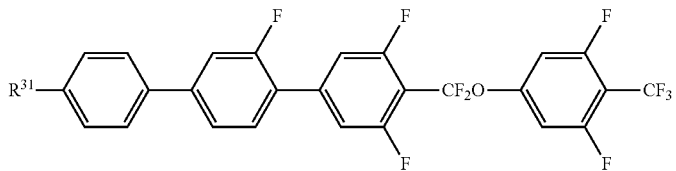

In formula (2-1) and formulas (2-1-1) to (2-1-13), $R^{31}$ is alkyl having 1 to 12 carbons, alkoxy having 1 to 12 carbons or alkenyl having 2 to 12 carbons; ring $A^{31}$ is 1,4-phenylene, 2-fluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; ring $A^{41}$ and ring $A^{51}$ are independently 1,4-phenylene, 2-fluoro-1,4-phenylene or 2,6-difluoro-1,4-phenylene; $Z^{31}$, $Z^{41}$ and $Z^{51}$ are independently a single bond, ethylene, vinylene, methyleneoxy, carbonyloxy, difluoromethyleneoxy, tolan or tetrafluoroethylene, in which at least one of $Z^{31}$, $Z^{41}$ and $Z^{51}$ is difluoromethyleneoxy; $X^{51}$ and $X^{61}$ are independently hydrogen or fluorine; $Y^{11}$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and $m^1$ is 0, 1 or 2, and when $m^1$ represents 2, a plurality of ring $A^{41}$ and $Z^{41}$ existing therein may be identical to or different from each other.

In order to increase the dielectric anisotropy of the compound, or increasing the maximum temperature of the transition temperature from the nematic phase to the isotropic phase, preferred $m^1$ is 1.

In order to increase the dielectric anisotropy of the compound, preferred $Z^{31}$, $Z^{41}$ or $Z^{51}$ is difluoromethyleneoxy, and in order to increase the specific resistance of the compound, preferred $Z^{31}$, $Z^{41}$ or $Z^{51}$ is a single bond.

In order to increase the optical anisotropy of the compound, preferred ring $A^{31}$ is 1,4-phenylene, 2-fluoro-1,4-phenylene or 2,6-difluoro-1,4-phenylene.

In formula (2-1), preferred ring $A^{41}$ or ring $A^{51}$ is 1,4-phenylene or 2-fluoro-1,4-phenylene. With regard to a configuration of 1,4-cyclohexylene, trans is preferred to cis for increasing the maximum temperature. Tetrahydropyran-2,5-diyl includes:

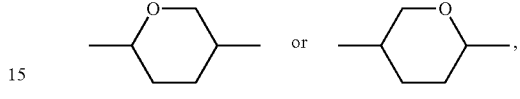

and preferably

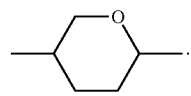

In order to increase the dielectric anisotropy of the compound, preferred $X^{51}$ or $X^{61}$ is fluorine.

In order to decrease the minimum temperature of the transition temperature from the nematic phase to the crystal in the compound, preferred $Y^{11}$ is fluorine.

When the compound contained in liquid crystal component 2 is a compound represented by formula (2-1), at least one of the compounds is preferably a compound represented by formula (2-1-2), a compound represented by formula (2-1-5), a compound represented by formula (2-1-6), or a compound represented by formula (2-1-10). Moreover, when the compound contained in liquid crystal component 2 is a compound represented by formula (2-1), at least two of the compounds are preferably a combination of a compound represented by formula (2-1-2) and a compound represented by formula (2-1-6), a combination of a compound represented by formula (2-1-5) and a compound represented by formula (2-1-6), or a combination of a compound represented by formula (2-1-6) and a compound represented by formula (2-1-10).

Moreover, among the compounds represented by formula (2-2), a compound represented by the following formulas (2-2-1) to (2-2-12) each is preferred.

(2-2)

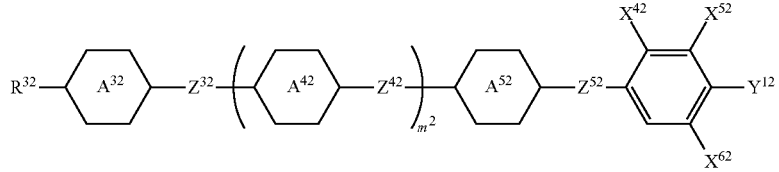

(2-2-1)

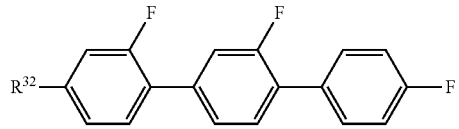

(2-2-2)

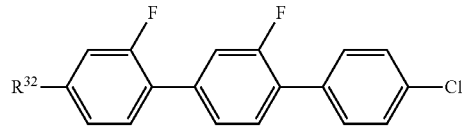

-continued (2-2-3) 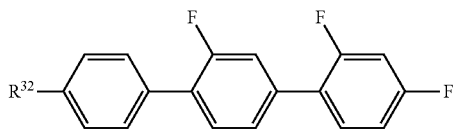

(2-2-4) 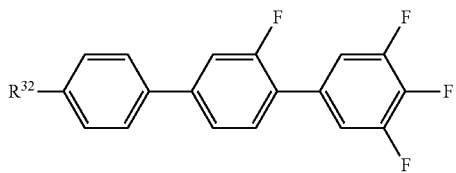

(2-2-5) 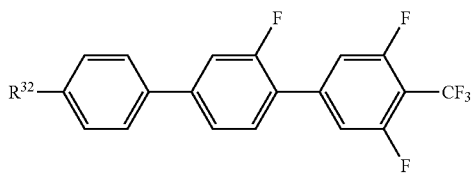

(2-2-6) 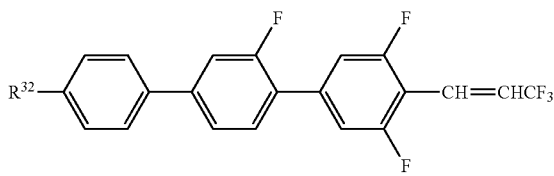

(2-2-7) 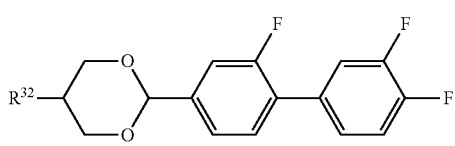

(2-2-8) 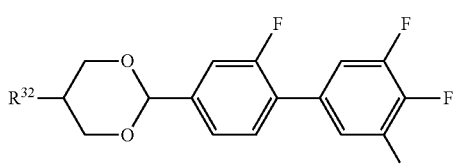

(2-2-9) 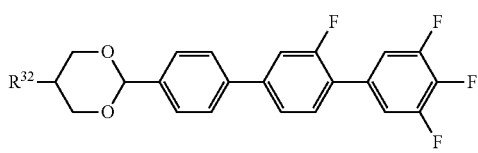

(2-2-10) 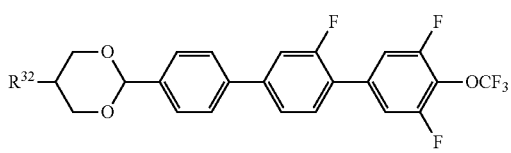

(2-2-11) 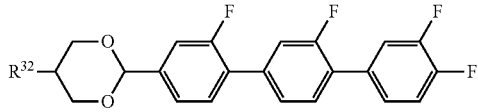

(2-2-12) 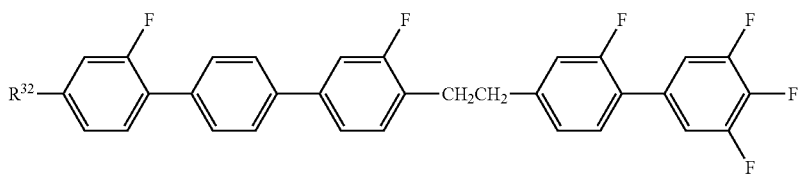

In formula (2-2), and formulas (2-2-1) to (2-2-12), $R^{32}$ is alkyl having 1 to 12 carbons, alkoxy having 1 to 12 carbons or alkenyl having 2 to 12 carbons; ring $A^{32}$ is 1,4-phenylene, 2-fluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; ring $A^{42}$ and ring $A^{52}$ are independently 1,4-phenylene, 2-fluoro-1,4-phenylene or 2,6-difluoro-1,4-phenylene; $Z^{32}$, $Z^{42}$ and $Z^{52}$ are independently a single bond, ethylene, vinylene, methyleneoxy, carbonyloxy, tolan or tetrafluoroethylene; $X^{42}$, $X^{52}$ and $X^{62}$ are independently hydrogen or fluorine, in which a case where $X^{42}$ and $X^{52}$ are simultaneously fluorine is excluded; $Y^{12}$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; $m^2$ is 0, 1 or 2, and when $m^2$ represents 2, a plurality of ring $A^{42}$ and $Z^{42}$ existing therein may be identical to or different from each other; in which a compound represented by formula (2-1) is excluded.

In order to increase the dielectric anisotropy of the compound, or in order to decrease the minimum temperature of the transition temperature from the nematic phase to the crystal, preferred $m^2$ is 0.

In order to increase the specific resistance of the compound, preferred $Z^{32}$, $Z^{42}$ or $Z^{52}$ is a single bond.

In order to increase the optical anisotropy of the compound, preferred ring $A^{32}$ is 1,4-phenylene, 2-fluoro-1,4-phenylene or 2,6-difluoro-1,4-phenylene.

In formula (2-2), preferred ring $A^{42}$ or ring $A^{52}$ is 1,4-phenylene or 2-fluoro-1,4-phenylene. With regard to a configuration of 1,4-cyclohexylene, trans is preferred to cis for increasing the maximum temperature of the transition temperature from the nematic phase to the isotropic phase. Tetrahydropyran-2,5-diyl includes:

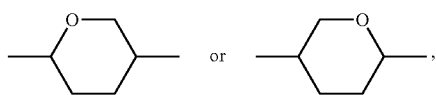

and preferably

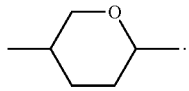

In order to increase the dielectric anisotropy of the compound, preferred $X^{42}$, $X^{52}$ or $X^{62}$ is fluorine.

In order to decrease the minimum temperature of the transition temperature from the nematic phase to the crystal in the compound, preferred $Y^{12}$ is fluorine.

When the compound contained in liquid crystal component 2 is a compound represented by formula (2-2), at least one of the compounds is preferably a compound represented by formula (2-2-4) or a compound represented by formula (2-2-5). When the compound contained in liquid crystal component 2 is a compound represented by formula (2-2), at least two of the compounds are preferably a combination of a compound represented by formula (2-2-4) and a compound represented by formula (2-2-5).

Liquid Crystal Component 3

Liquid crystal component 3 is a compound represented by formula (3). Liquid crystal component 3 may be one compound or may be a combination of a plurality of compounds, if the compound represented by the following formula (3) is applied.

(3)

In formula (3), $R^4$ and $R^5$ are independently alkyl having 1 to 12 carbons, alkoxy having 1 to 12 carbons or alkenyl having 2 to 12 carbons; ring $A^6$ or ring $A^7$ is independently 1,4-cyclohexylene, 1,4-phenylene, 2-fluoro-1,4-phenylene, 2,5-difluoro-1,4-phenylene or 2,6-difluoro-1,4-phenylene; $Z^6$ or $Z^7$ is independently a single bond, ethylene, vinylene, methyleneoxy, carbonyloxy, difluoromethyleneoxy, tolan or tetrafluoroethylene; n is 0, 1 or 2, and when n represents 2, a plurality of ring $A^7$ and $Z^7$ existing therein may be identical to or different from each other; in which a compound represented by formula (1-1) is excluded.

Among the compounds represented by formula (3), a compound represented by formulas (3-1) to (3-12) each is preferred.

(3-1)
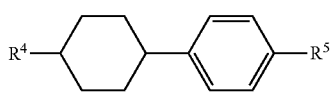

(3-2)
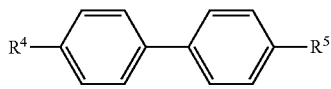

(3-3)
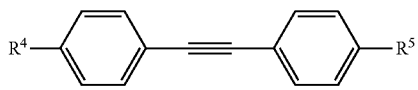

-continued (3-4)
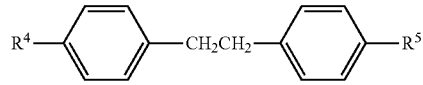

(3-5)

(3-6)

(3-7)

(3-8)
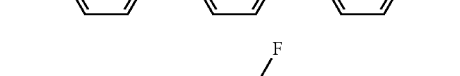

(3-9)
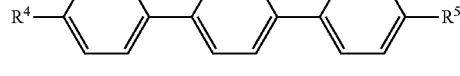

(3-10)
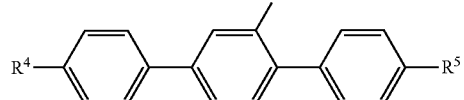

(3-11)
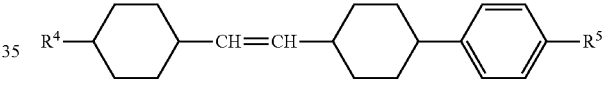

(3-12)
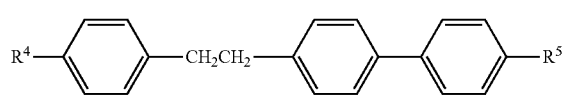

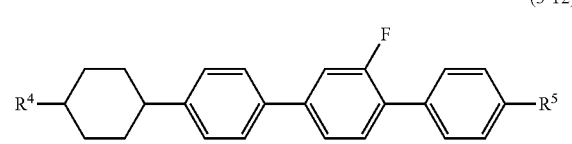

In formulas (3-1) to (3-12), $R^4$ and $R^5$ are independently alkyl having 1 to 12 carbons, alkoxy having 1 to 12 carbons or alkenyl having 2 to 12 carbons.

In the compounds represented by formulas (3-1) to (3-12), at least one of the compounds contained in liquid crystal component 3 is preferably compound (3-2), compound (3-3), compound (3-8), compound (3-9) or compound (3-12). At least two of the compounds contained in liquid crystal component 3 are preferably a combination of compound (3-3) and compound (3-8), or a combination of compound (3-3) and compound (3-12).

Preferred alkyl herein is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy herein is methoxy, ethoxy, propoxy, butoxy, pentyloxy, hexyloxy or heptyloxy. Further preferred alkoxy is methoxy or ethoxy for decreasing the viscosity.

Preferred alkenyl herein is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, or the like. Cis is preferred in alkenyl such as 2-butenyl, 2-pentenyl and 2-hexenyl. In the alkenyl, straight-chain alkenyl is preferred to branched-chain alkenyl.

(2) Optically Active Compound

For the purpose of inducing a helical structure of a liquid crystal to give a twist angle, the liquid crystal composition may contain an optically active compound. Specific examples of such an optically active compound include compounds represented by formulas (5-1) to (5-5).

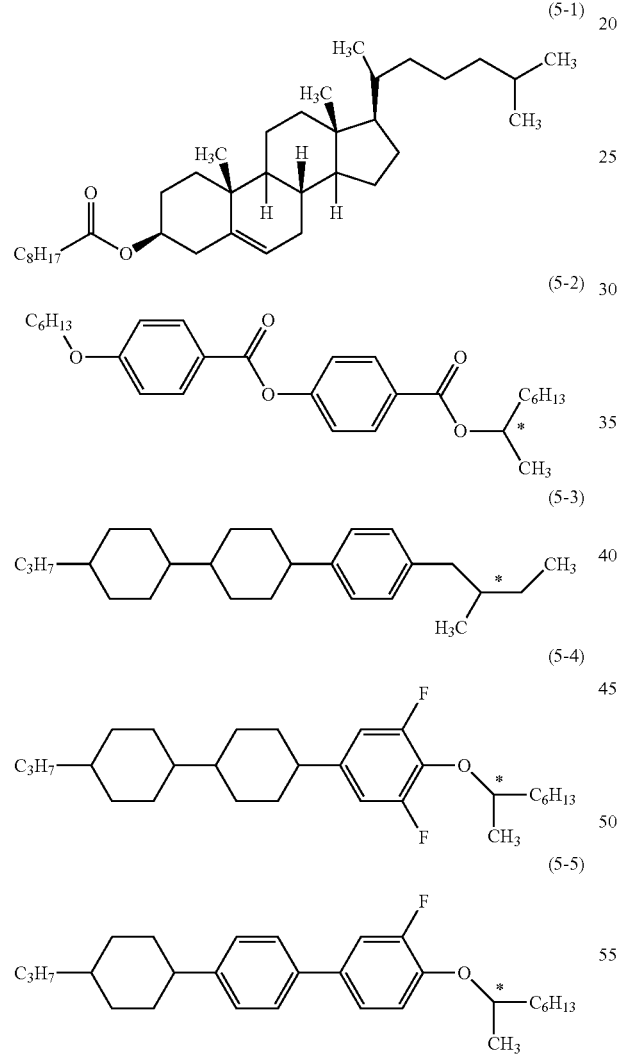

The optically active compounds may be one compound or a combination of two or more compounds. Moreover, the liquid crystal composition preferably contains the optically active compound in an amount of about 5% by weight or less, and further preferably in an amount of about 0.01 to about 2% by weight, based on the total weight of the liquid crystal composition.

(3) Antioxidant

In order to prevent a decrease in the specific resistance of the liquid crystal composition by heating in air, or in order to maintain the large voltage holding ratio at room temperature and also at a temperature close to the maximum temperature even after the device has been used for a long period of time, the liquid crystal composition may contain an antioxidant. Specific examples of a preferred antioxidant include a compound represented by formula (6) (where, t is an integer from 1 to 9)

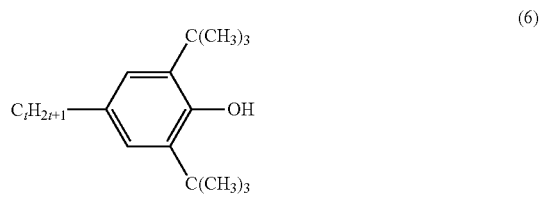

Preferred t in formula (6) is 1, 3, 5, 7 or 9. Further preferred t is 7. Because a compound represented by formula (6) in which t is 7 has a small volatility, the compound is effective in maintaining the large voltage holding ratio at room temperature and also at a temperature close to the maximum temperature of the transition temperature from the nematic phase to the isotropic phase even after the device has been used for a long period of time.

A preferred proportion of the antioxidant in the liquid crystal composition is about 50 ppm or more for obtaining an effect thereof, and about 600 ppm or less for preventing a decrease in the maximum temperature of the transition temperature from the nematic phase to the isotropic phase, or for preventing a decrease in the minimum temperature of the transition temperature from the nematic phase to the crystal. A further preferred proportion is in the range of about 100 ppm to about 300 ppm.

(4) Ultraviolet Light Absorber

The liquid crystal composition may contain an ultraviolet light absorber. Specific examples of a preferred ultraviolet light absorber include a benzophenone derivative, a benzoate derivative, and a triazole derivative. A light stabilizer such as an amine having steric hindrance is also preferred. A preferred proportion of the absorbents and the stabilizers each is about 50 ppm or more for obtaining an effect thereof, and about 10,000 ppm or less for preventing a decrease in the maximum temperature of the transition temperature from the nematic phase to the isotropic phase, or for preventing a decrease in the minimum temperature of the transition temperature from the nematic phase to the crystal. A further preferred proportion is in the range of about 100 ppm to about 10,000 ppm.

(5) Dichroic Dye

The liquid crystal composition may contain a dichroic dye such as an azo dye and an anthraquinone dye to be adapted for a device having a guest host (GH) mode, for example. A preferred proportion of the dichroic dye contained in the liquid crystal composition is in the range of about 0.01 to about 10% by weight.

Moreover, for preventing foam formation of the liquid crystal composition, an antifoaming agent such as dimethyl silicone oil and methylphenyl silicone oil may be further added to the liquid crystal composition. A preferred proportion of the antifoaming agent is about 1 ppm or more for achieving an effect thereof, and about 1,000 ppm or less for preventing a poor display. A further preferred proportion is in the range of about 1 ppm to about 500 ppm.

2.1.2 Monomer

A monomer used in the method for producing the liquid crystal capsule according to the invention serves as a material of the capsule wall of the liquid crystal capsule. More specifically, the monomer is polymerized so as to wrap the liquid crystal composition to form the capsule wall having the closed curved shape according to a coacervation method to be described later. The monomer according to the invention is not particularly limited, if a monomer having a polymerization group is applied. However, in order to successfully cause formation of the capsule wall according to the coacervation method, interfacial tension among the monomer, the liquid crystal components constituting the liquid crystal material, and water used in the method for producing the liquid crystal capsule preferably satisfies a relationship represented by the following formulas (a) to (c):

$$\gamma_{23} - (\gamma_{12} + \gamma_{13}) < 0 \qquad (a);$$

$$\gamma_{13} - (\gamma_{12} + \gamma_{23}) > 0 \qquad (b); \text{ and}$$

$$\gamma_{12} - (\gamma_{13} + \gamma_{23}) < 0 \qquad (c),$$

where, in formulas (a) to (c), a subscript 1 represents a liquid crystal composition, a subscript 2 represents a monomer, a subscript 3 represents water, and $\gamma_{12}$, $\gamma_{13}$ and $\gamma_{23}$ are represented by the following formulas:

$$\gamma_{12} = \gamma_1 + \gamma_2 - 2(\gamma_1{}^d \gamma_2{}^d)^{1/2} - 2(\gamma_1{}^h \gamma_2{}^h)^{1/2};$$

$$\gamma_{13} = \gamma_1 + \gamma_3 - 2(\gamma_1{}^d \gamma_3{}^d)^{1/2} - 2(\gamma_1{}^h \gamma_3{}^h)^{1/2}; \text{ and}$$

$$\gamma_{23} = \gamma_2 + \gamma_3 - 2(\gamma_2{}^d \gamma_3{}^d)^{1/2} - 2(\gamma_2{}^h \gamma_3{}^h)^{1/2},$$

where, $\gamma$ satisfies an equation: $\gamma = \gamma^d + \gamma^h$, a subscript d represents a non-polarity dispersion force component, and a subscript h represents a polar hydrogen bonding component.

Specific examples of the monomer used in the method for producing the liquid crystal capsule according to the invention include styrene and alkyl (meth)acrylate. Among the monomers, styrene, methyl methacrylate, divinylbenzene or ethylene glycol dimethacrylate is preferably used as the monomer.

2.1.3 Surfactant

The surfactant used in the method for producing the liquid crystal capsule according to the invention is not particularly limited, if the surfactant has surface activity, and the surfactant is preferably a block copolymer having the hydrophilic moiety and the hydrophobic moiety, and further preferably diblock copolymer.

Moreover, as the surfactant, partially saponified poly (vinyl alcohol) and a nonionic surfactant are preferred. A particularly preferred compound as the nonionic surfactant is a compound prepared by allowing addition polymerization of ethylene oxide and propylene oxide in a sequential block manner into long chain alcohol in which the total content of saturated or unsaturated straight chain aliphatic long chain alcohol having 16 to 18 carbons is about 50% by weight or more, and a proportion of stearyl alcohol therein is about 60% by weight or less, and having, at a terminal, a structure represented by -EPE (where, E represents an addition polymerization unit of ethylene oxide, and P represents an addition polymerization unit of propylene oxide), in which the total average number of moles of added ethylene oxide is about 3 to about 20, and the total average number of moles of added propylene oxide is about 1 to about 4.9, and the average number of moles of added propylene oxide at E of the terminal is about 2 or more. Such a nonionic surfactant is sold under a tradename "Emulgen" from Kao Corporation.

The surfactant can be produced by polymerizing a hydrophobic monomer with a hydrophilic monomer.

Specific examples of the hydrophobic monomer include liner, branched, cyclic or aromatic monocarboxylic acid ester or polycarboxylic acid ester each containing at least one ethylene unsaturated group; saturated carboxylic acid ester optionally having a hydroxy group and containing 8 to 30 carbon atoms; α,β-ethylene unsaturated nitrile, vinyl ether, vinyl ester, a vinyl aromatic monomer, vinyl halide or vinylidene halide; a liner or branched, aromatic or non-aromatic hydrocarbon-based monomer containing at least one ethylene unsaturated group; a cyclic or acyclic siloxane type monomer, and chlorosilane; and propylene oxide or butylene oxide.

The hydrophobic monomer may be one monomer, a mixture of two or more monomers, or a macromonomer derived from the monomer.

Specific examples of the hydrophobic monomer include ester of alcohol containing 1 to 18 carbon atoms and (meth)acrylic acid, such as methyl (meth)acrylate, ethyl (meth)acrylate, propyl (meth)acrylate, n-butyl (meth)acrylate, t-butyl (meth)acrylate, isobutyl (meth)acrylate or 2-ethylhexyl acrylate; vinyl acetate, vinyl versatate (Versatate (registered trademark)), vinyl propionate, vinyl chloride, vinylidene chloride, methyl vinyl ether or ethyl vinyl ether; vinylnitrile, more specially vinylnitrile containing 3 to 12 carbon atoms, above all, acrylonitrile, methacrylonitrile and methacrylonitrile; styrene, α-methylstyrene, vinyltoluene, butadiene or chloroprene; divinylbenzene, a single product or a mixture of ethylene glycol dimethacrylate, and a macromonomer derived from the monomer.

As the hydrophilic monomer, all of an anionic monomer, a cationic monomer and a nonionic monomer can be used.

Specific examples of the anionic monomer include a compound represented by the following structural formula (AM1), (AM2) or (AM3):

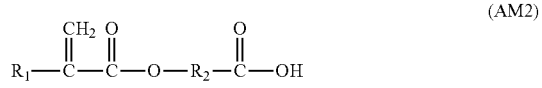

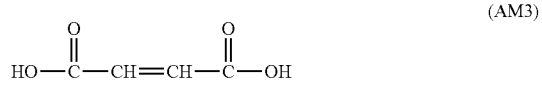

where, $R_1$ is —H, —$CH_3$ or —$CH_2CH_3$, and $R_2$ is —$(CH_2)_n$— (where, n is an integer from 1 to 40)); straight-chain or branched alkyl; cycloalkyl; aryl; and ethylenic unsaturated carboxylic acid selected from the group of a polyethylene oxide chain represented by formula —($CH_2$— $CH_2$—O)$_{p1}$— (where, p1 is an integer from 1 to 50), and a polypropylene oxide chain represented by formula —(CH($CH_3$)—$CH_2$—O)$_{p2}$— (where, p2 is an integer from 1 to 100).

Moreover, specific examples of the anionic monomer also include styrene sulfonic acid and sodium styrenesulfonate.

Specific examples of the cationic monomer include a compound represented by the following structural formula (CM1) or (CM2):

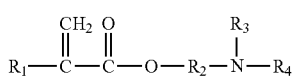
(CM1)

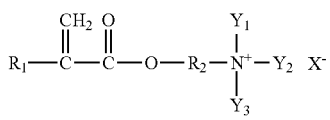
(CM2)

where, $R_1$ is —H and —$CH_3$ or —$CH_2CH_3$, and $R_2$ is —$(CH_2)_n$— (where, n is an integer from 1 to 40); straight-chain or branched alkyl; cycloalkyl; aryl; a polyethylene oxide chain represented by formula —$(CH_2$—$CH_2$—$O)_{p3}$— (where, p3 is an integer from 1 to 100) or a polypropylene oxide chain represented by formula —$(CH(CH_3)$—$CH_2$—$O)_{p4}$— (where, p4 is an integer from 1 to 100), and $R_3$, $R_4$, $Y_1$, $Y_2$ and $Y_3$ may be —H, —$CH_3$, —$CH_2CH_3$, branched or straight-chain alkyl, aryl, cycloalkyl or a combination thereof.

Specific examples of the nonionic monomer include a compound selected from the group of:

(1) acrylate and methacrylate selected from the group of hydroxyethyl methacrylate, hydroxyethyl acrylate, hydroxypropyl acrylate, methoxy-polyethylene oxide methacrylate, and methoxy-polyethylene oxide methacrylate represented by the following structural formula (NM1):

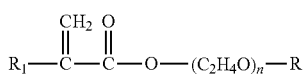
(NM1)

where, n is an integer from 1 to 100, $R_1$ is —H, —$CH_3$ or —$CH_2CH_3$, and R is selected from the group of H, OH, a methyl group, an ethyl group, a lauryl group, a stearyl group, a carboxyl group, an amino group and a combination thereof;

(2) ethylenic unsaturated amide represented by the following structural formula (NM2):

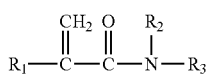
(NM2)

where, $R_1$ is —H, —$CH_3$ or —$CH_2CH_3$, and $R_2$ is selected from the group of H, OH, a methyl group, a methylol group, an ethyl group, a lauryl group, a stearyl group, a carboxyl group, an amino group and a combination thereof, in addition, $R_3$ is preferably selected from the group of acrylamide, methacrylamide, methylacrylamide, dimethylacrylamide, fumaramide, diacetone acrylamide, and dimethylmethacrylamide;

(3) a cyclic amide represented by the following structural formula (NM3):

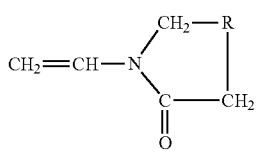
(NM3)

where R is an alkylene group such as —$[CH_2]_n$— (where, n is an integer from 1 to 4), where the cyclic amide is, for example, vinyl pyrrolidone (n=1) or vinylcaprolactam (n=2);

(4) acrylate and methacrylate having a sugar skeleton; and (5) a combination thereof.

As a method for producing the surfactant being the block copolymer, according to the invention, living radical polymerization, living cationic polymerization, living anionic polymerization or the like, each being living polymerization, can be applied, and in particular the surfactant is preferably produced by applying the living radical polymerization. As the living radical polymerization, polymerization by nitroxide (NMP: Nitroxide-Mediated radical Polymerization), polymerization by a metal catalyst (ATRP: Atom Transfer Radical Polymerization), polymerization by a thiocarbonyl compound (RAFT: Reversible Addition Fragmentation chain Transfer polymerization) or the like can be applied.

The number average molecular weight of the surfactant according to the invention is preferably 1,000 to 50,000, and particularly preferably 5,000 to 30,000.

2.1.4 Polymerization Initiator

A polymerization reaction in the method for producing the liquid crystal capsule according to the invention is not particularly restricted, and for example, photoradical polymerization, thermal radical polymerization, photocationic polymerization or the like is performed.

Specific examples of a photoradical polymerization initiator which can be used in the photoradical polymerization include DAROCUR (registered trademark) 1173 and 4265 (tradenames for both, BASF SE), and IRGACURE (registered trademark) 184, 369, 500, 651, 784, 819, 907, 1300, 1700, 1800, 1850, and 2959 (tradenames for all, BASF SE).

Specific examples of a preferred polymerization initiator for radical polymerization by heat, which can be used in the thermal radical polymerization, include benzoyl peroxide, diisopropyl peroxydicarbonate, t-butyl peroxy-2-ethylhexanoate, t-butyl peroxypivalate, t-butyl peroxyisobutyrate, lauroyl peroxide, dimethyl 2,2'-azobis(isobutyrate) (MAIB), di-t-butyl peroxide (DTBPO), azobisisobutyronitrile (AIBN) and azobiscyclohexanecarbonitrile (ACN).

Specific examples of a photocationic polymerization initiator which can be used in the photocationic polymerization include diaryliodonium salt (hereinafter, referred to as "DAS") and triaryl sulfonium salt (hereinafter, referred to as "TAS").

Specific examples of DAS include diphenyl iodonium tetrafluoroborate, diphenyl iodonium hexafluoro phosphonate, diphenyl iodonium hexafluoroarsenate, diphenyl iodonium trifluoromethane sulphonate, diphenyl iodonium trifluoroacetate, diphenyl iodonium-p-toluene sulphonate, diphenyl iodonium tetra(pentafluorophenyl)borate, 4-methoxyphenyl phenyl iodonium tetrafluoroborate, 4-methoxyphenyl phenyl iodonium hexafluorophosphonate, 4-methoxyphenyl phenyl iodonium hexafluoroarsenate, 4-methoxyphenyl phenyl iodonium trifluoromethane sulphonate, 4-methoxyphenyl phenyliodonium trifluoroacetate, and 4-methoxyphenyl phenyl iodonium-p-toluenesulfonate.

High sensitivity can also be achieved by adding, to DAS, a photosensitizer such as thioxanthone, phenothiazine, chlorothioxanthone, xanthone, anthracene, diphenylanthracene and rubrene.

Specific example of TAS include triphenyl sulfonium tetrafluoroborate, triphenyl sulfonium hexafluoro phosphonate, triphenyl sulfonium hexafluoroarsenate, triphenyl sulfonium trifluoromethanesulfonate, triphenyl sulfonium trifluoroacetate, triphenyl sulfonium-p-toluene sulphonate, triphenyl sulfonium tetra(pentafluorophenyl) borate, 4-methoxyphenyl diphenyl sulfonium tetrafluoroborate, 4-methoxyphenyl diphenyl sulfonium hexafluorophosphonate, 4-methoxyphenyl diphenyl sulfonium hexafluoroarsenate, 4-methoxyphenyl diphenyl sulfonium trifluoromethanesulfonate, 4-methoxyphenyl diphenyl sulfonium trifluoroacetate and 4-methoxyphenyl diphenyl sulfonium-p-toluene sulphonate.

Specific examples of a specific tradename of the photo-cationic polymerization initiator include Cyracure (registered trademark) UVI-6990, Cyracure UVI-6974, Cyracure UVI-6992 (tradenames, respectively, UCC), Adekaoptomer SP-150, SP-152, SP-170, SP-172 (tradenames, respectively, ADEKA Corporation), Rhodorsil Photoinitiator 2074 (product name, Rhodia Japan, Ltd.), IRGACURE (registered trademark) 250 (tradename, BASF SE), and UV-9380C (tradename, GE Toshiba Silicones Co., Ltd.).

As a redox initiator which can be used in the radical polymerization, an initiator formed of a combination of an oxidizing agent and a reducing agent such as a combination of hydrogen peroxide and iron(II) salt, and a combination of persulfate and sodium hydrogensulfite may be used.

An amount of use of the polymerization initiator is preferably 0.01 to 0.3 parts by weight, and further preferably 0.01 to 0.2 parts by weight based on 1 part by weight of the monomer.

2.2 Step of Constructing a Capsule Wall by Applying a Coacervation Method (Step B)

If water is further added to a mixture containing the O/W type emulsion obtained in step A, the monomer being a raw material of the capsule wall is pulled by a material having a low polarity. More specifically, the monomer is pulled by liquid crystal composition 1 and the hydrophobic moiety of surfactant 2. Thus, the monomers are arranged so as to surround liquid crystal composition 1 and the hydrophobic moiety of surfactant 2, and the monomers are polymerized to construct capsule wall 3 (FIG. 1).

3 Liquid Crystal Device

A liquid crystal device according to the invention has a set of substrates arranged facing each other, an electrode formed on one or both sides facing each other of the set of substrate, the liquid crystal capsule described in any one of the above items 4 to 7, the liquid crystal capsule being arranged between the substrates, and an electric field application means for applying an electric field to the liquid crystal capsule through the electrode. In the liquid crystal device according to the invention, a polarizing plate may be arranged outside the substrate. The polarizing plate may be one or two. Moreover, in the liquid crystal device according to the invention, a reflector may be arranged outside the substrate.

Specific examples of a raw material of the substrate used in the invention include glass and a plastic, and a set of substrates may have materials identical to or different from each other. Moreover, the substrate is preferably transparent, but may be opaque. At least one of the set of substrates is preferably transparent.

The electrode used in the invention is preferably transparent, but may be opaque. When the electrodes are formed on both sides of the set of substrates, at least one is preferably transparent. As the transparent electrode, for example, an ITO electrode is used. Both are acceptable whether the electrode is formed wholly on a surface of the substrate, or into a pattern shape. When the electrode is formed in only one of the set of substrates, the electrode is preferably a comb-type electrode.

EXAMPLES

Hereinafter, the invention will be further described by way of Examples, but not limited thereby.

Synthesis of a surfactant
(PDMAEMA$_{39}$-b-PMMA$_{22}$)

To a recovery flask, 0.14 mmol of 4-cyano-4-(phenylcarbonothioylthio)pentanoic acid (CPCTP), 5.5 mmol of 2-(N,N-dimethylamino)ethyl methacrylate (DMAEMA), 0.014 mmol of AIBN, and 0.67 mL of tetrahydrofuran (THF) were added, and the resulting mixture was subjected to freeze-pump-thaw three times. The reaction system was filled with nitrogen, and a reaction was performed at 70° C. for 8 hours. To 0.63 g of the resulting compound (PDMAEMA$_{39}$ macroRAFT agent), 1.9 mmol of methyl methacrylate (MMA), 0.0096 mmol of AIBN, and 0.73 mL of THF were added, and then the resulting mixture was subjected to freeze-pump-thaw three times, and filled with nitrogen, and a reaction was performed at 70° C. for 18 hours. Thus, PDMAEMA$_{39}$-b-PMMA$_{22}$ represented by the following formula as a block polymer was prepared.

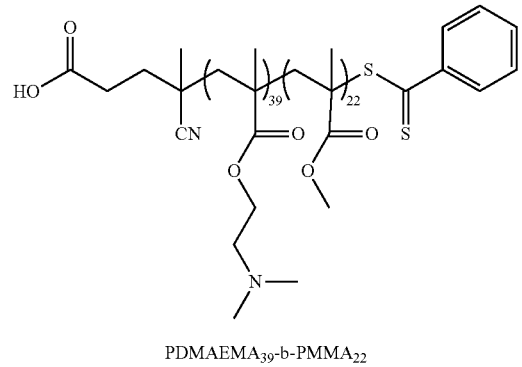

PDMAEMA$_{39}$-b-PMMA$_{22}$

For the resulting compound (PDMAEMA$_{39}$-b-PMMA$_{22}$), a degree of polymerization, a molecular weight, and polydispersity were determined by measurement using 1H-NMR and GPC.

NMR
1H-NMR (Lambda 500 MHz [JEOL])
Mn: 6,410

GPC Measurement
Measuring apparatus: pump L-700 (Hitachi), a column constant-temperature chamber CO-8010 (TOSOH), differential refractometer RI8010 (TOSOH), ultraviolet-visible detector UV-8010 (TOSOH), Degasser ERC-3115α (Showa Denko), and data processing software Chromato-PRO Ver.3.0.0 (Run-time instruments)

Measuring conditions: column TSKgel α3000 (TOSOH), temperature: 40° C., flow rate: 0.6 mL/min, eluate: DMF, detection RI (differential refractive index detection), and standard: polystyrene
Mn: 5,700
Mw/Mn: 1.16

Moreover, compositions of liquid crystal materials (JD-5037XX, JD-5039XX, JD-5040XX, JD-5041XX) used in Examples herein were as described below.

In addition, abbreviations described in the following compositions are based on the method for description described in Table 2.

TABLE 2

| JD-5039XX | |
|---|---|
| 3-BB(F,F)XB(F,F)-F | 20% |
| 3-HH-4 | 5% |
| 3-HBB(F,F)-F | 4% |
| 2-HHB(F,F)-F | 10% |
| 3-HHB(F,F)-F | 10% |
| 3-H2HB(F,F)-F | 10% |
| 4-H2HB(F,F)-F | 5% |
| 5-H2HB(F,F)-F | 10% |
| 3-HH2B(F,F)-F | 5% |
| 2-HHBB(F,F)-F | 4% |
| 3-HHBB(F,F)-F | 5% |
| 4-HHBB(F,F)-F | 4% |
| 5-HHBB(F,F)-F | 5% |
| 3-HH2BB(F,F)-F | 3% |

| JD-5040XX | |
|---|---|
| 1V2-BEB(F,F)-C | 22% |
| V2-BEB(F,F)-C | 4% |
| 2-BEB(F)-C | 4% |
| 3-BEB(F)-C | 4% |
| 3-H2BTB-2 | 6% |
| 3-H2BTB-3 | 6% |
| 3-H2BTB-4 | 6% |
| 3-HB(F)TB-2 | 8% |
| 3-HB(F)TB-3 | 8% |
| 3-HB(F)TB-4 | 8% |
| 2-BTB-O1 | 2% |
| 3-BTB-O1 | 2% |
| 4-BTB-O1 | 2% |
| 4-BTB-O2 | 2% |
| 5-BTB-O1 | 2% |
| 5-HBB(F)-2 | 7% |
| 5-HBB(F)-3 | 7% |

| JD-5037XX | |
|---|---|
| 3-HHXB(F,F)-F | 12% |
| 3-BB(F)B(F,F)XB(F,F)-F | 2% |
| 4-BB(F)B(F,F)XB(F,F)-F | 9% |
| 5-BB(F)B(F,F)XB(F,F)-F | 9% |
| V2-HHB-1 | 13% |
| 3-HH-V | 34% |
| 3-HH-V1 | 12% |
| 3-BB(F,F)XB(F,F)-F | 9% |

| JD-5041XX | |
|---|---|
| 3-BB(F)B(F,F)XB(F,F)-F | 2% |
| 4-BB(F)B(F,F)XB(F,F)-F | 8% |
| 5-BB(F)B(F,F)XB(F,F)-F | 8% |
| 3-BB(F)B(F,F)XB(F)-F | 3% |
| 3-BB(F,F)XB(F)B(F,F)-F | 6% |
| 3-BB(F,F)XB(F,F)-F | 9% |
| 3-HB(F)TB-2 | 5% |
| 3-HB(F)TB-3 | 5% |
| 3-HB(F)TB-4 | 5% |
| 3-H2BTB-2 | 4% |
| 3-H2BTB-3 | 4% |
| 2-BTB-O1 | 8.2% |
| 3-BTB-O1 | 8.2% |
| 4-BTB-O1 | 8.2% |
| 4-BTB-O2 | 8.2% |
| 5-BTB-O1 | 8.2% |

TABLE 2

Method for Description of Compounds using Symbols
R—(A$_1$)—Z$_1$— ... —Z$_n$—(A$_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |

| 2) Right-terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —$C_nH_{2n}$—CH=CH—$C_mH_{2m+1}$ | —nVm |
| —CH=$CF_2$ | —VFF |
| —COOCH$_3$ | —EMe |
| —F | —F |
| —Cl | —CL |
| —OCF$_3$ | —OCF3 |
| —CF$_3$ | —CF3 |
| —CN | —C |
| —OCH=CH—CF$_2$H | —OVCF2H |
| —OCH=CH—CF$_3$ | —OVCF3 |

| 3) Bonding Group —Z$_n$— | Symbol |
|---|---|
| —$C_2H_4$— | 2 |
| —COO— | E |
| —CH=CH— | V |
| —C≡C— | T |
| —CF$_2$O— | X |
| —CH$_2$O— | 1O |

| 4) Ring Structure —A$_n$— | Symbol |
|---|---|
| (cyclohexane) | H |
| (tetrahydropyran, O top) | Dh |
| (tetrahydropyran, O side) | dh |
| (benzene) | B |
| (fluorobenzene) | B(F) |
| (difluorobenzene) | B(2F) |

TABLE 2-continued

Method for Description of Compounds using Symbols
R—(A$_1$)—Z$_1$— . . . —Z$_n$—(A$_n$)—R'

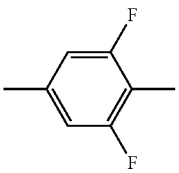   B(F,F)

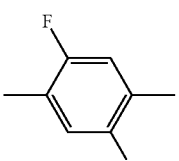   B(2F,5F)

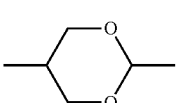   G

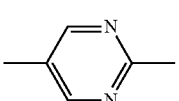   Py

5) Example of Description

Example 1. 3-BB(F)TB-2

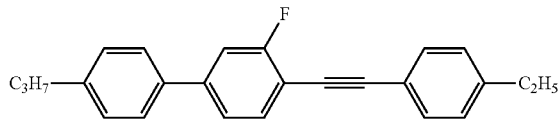

Example 2. 3-BB(F)B(F,F)-F

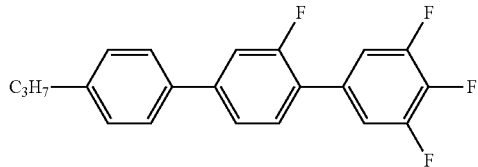

TABLE 2-continued

Method for Description of Compounds using Symbols
R—(A$_1$)—Z$_1$— . . . —Z$_n$—(A$_n$)—R'

Example 3. 4-BB(F)B(F,F)XB(F,F)-F

Example 1

Preparation of a Liquid Crystal Capsule

A liquid crystal material (JD-5037XX: 0.70 mL) was incorporated with a monomer (MMA: 2.8 mmol) in a recovery flask, and PDMAEMA$_{39}$-b-PMMA$_{22}$ (10 mg) and AIBN (0.028 mmol) were dissolved in the resulting mixture. Deionized water (10 mL) was added dropwise onto the resulting mixture while the mixture was stirred at 60° C., and the reaction system was subjected to phase inversion emulsification from an oil phase to a water phase, and then subjected to nitrogen degassing for 10 minutes to prepare an O/W type emulsion. The resulting emulsion was stirred for 24 hours, and then immersed into an ice bath and cooled to stop polymerization.

The resulting mixture was filtrated with a mesh filter (Ø 150 μm), and then operation of centrifugation (13,500 rpm, 60 min, centrifuge: MiniSpinplus (Eppendorf)), removal of a supernatant, and re-dispersion to deionized water was repeated three times to prepare a liquid crystal capsule. An average particle diameter of the prepared liquid crystal capsule was 80±14 nm.

Examples 2 to 7

Preparation of a Liquid Crystal Capsule

Liquid crystal capsules were prepared under conditions identical with the conditions in Example 1 except that a kind of monomer, an amount of addition of the monomer, an amount of addition of a liquid crystal material, and an amount of a polymerization initiator were changed.

Production conditions and particle diameters of the liquid crystal capsules prepared in Examples 1 to 7 were as described below. For a particle diameter, a measuring apparatus, a measuring method, and the number of cumulation for calculating an average particle diameter were as described below:

Measuring apparatus: ELSZ-1000 ZSCK light scattering apparatus (Otsuka Electronics Co., Ltd.)
Measurement temperature: Temperature 25° C.
Number of cumulation: 50 times

TABLE 3

| | Surfactant | | Monomer | | Liquid Crystal Material | | Initiator | |
|---|---|---|---|---|---|---|---|---|
| | Kind | Amount (mg) | Kind | Amount (mmol) | Kind | Amount (mL) | AIBN (mmol) | Average Particle Diameter nm |
| Example 1 | PDMAEMA39-b-PMMA22 | 10 | MMA | 2.8 | JD-5037XX | 0.70 | 0.028 | 80 ± 14 |
| Example 2 | PDMAEMA39-b-PMMA22 | 10 | MMA | 4.7 | JD-5037XX | 0.50 | 0.047 | 72 ± 16 |
| Example 3 | PDMAEMA39-b-PMMA22 | 10 | MMA | 2.6 | JD-5037XX | 0.50 | 0.048 | 62 ± 18 |
| | | | DVB | 0.13 | | | | |
| Example 4 | PDMAEMA39-b-PMMA22 | 10 | ST | 2.7 | JD-5037XX | 0.70 | 0.027 | 121 ± 34 |
| Example 5 | PDMAEMA39-b-PMMA22 | 10 | ST | 2.6 | JD-5037XX | 0.70 | 0.028 | 90 ± 19 |
| | | | DVB | 0.08 | | | | |

TABLE 3-continued

| | Surfactant | | Monomer | | Liquid Crystal Material | | Initiator | |
|---|---|---|---|---|---|---|---|---|
| | Kind | Amount (mg) | Kind | Amount (mmol) | Kind | Amount (mL) | AIBN (mmol) | Average Particle Diameter nm |
| Exampe 6 | PDMAEMA39-b-PMMA22 | 10 | ST | 4.5 | JD-5037XX | 0.50 | 0.045 | 140 ± 39 |
| Example 7 | PDMAEMA39-b-PMMA22 | 10 | ST DVB | 4.3 0.13 | JD-5037XX | 0.50 | 0.046 | 116 ± 25 |

MMA: Methyl methacrylate
DVB: Divinylbenzene
ST: Styrene

Example 8

Preparation of a Liquid Crystal Capsule

A monomer (ST: 108 mg), a liquid crystal material (JD-5037XX: 12 mg), and PDMAEMA$_{39}$-b-PMMA$_{22}$ (60 mg) were charged into a recovery flask, and deionized water (1.5 g) was further added thereto to prepare a W/O type emulsion, and then the W/O type emulsion was rapidly cooled in an ice bath to prepare an O/W type emulsion. Then, a solution obtained by dissolving VA-044 (2,2'-Azobis [2-(2-imidazolin-2-yl)propane]dihydrochloride) (0.046 mmol) in deionized water (4.5 g) was added to the reaction system, and then the resulting mixture was subjected to nitrogen degassing for 10 minutes, and stirred at 40° C. for 6 hours, and then immersed into an ice bath and cooled to stop polymerization to prepare a liquid crystal capsule. An average particle diameter of the liquid crystal capsule prepared was 49±14 nm. Measurement of the particle diameter and calculation of the average particle diameter were performed in a manner similar to Example 1.

Examples 9 to 21

Preparation of a Liquid Crystal Capsule

Liquid crystal capsules were prepared under conditions identical with the conditions in Example 8 except that a kind of monomer, an amount of addition of the monomer, an amount of addition of a liquid crystal material, and an amount of a polymerization initiator were changed.

Preparation conditions and average particle diameters of the liquid crystal capsules prepared in Examples 8 to 21 were as described below.

TABLE 4

| | Surfactant | | Monomer | | Liquid Crystal Material | | Initiator | |
|---|---|---|---|---|---|---|---|---|
| | Kind | Amount (mg) | Kind | Amount (mg) | Kind | Amount (mg) | VA-044 (mmol) | Average Particle Diameter nm |
| Example 8 | PDMAEMA39-b-PMMA22 | 60 | ST | 108 | JD-5037XX | 12 | 0.046 | 49 ± 14 |
| Example 9 | PDMAEMA39-b-PMMA22 | 60 | ST DVB | 95 0.96 | JD-5037XX | 24 | 0.046 | 55 ± 11 |
| Example 10 | PDMAEMA39-b-PMMA22 | 60 | ST DVB | 95 0.96 | JD-5040XX | 24 | 0.046 | 35 ± 10 |
| Example 11 | PDMAEMA39-b-PMMA22 | 60 | ST | 150 | JD-5037XX | 150 | 0.071 | 41 ± 7 |
| Example 12 | PDMAEMA39-b-PMMA22 | 60 | ST | 150 | JD-5040XX | 150 | 0.071 | 66 ± 12 |
| Example 13 | PDMAEMA39-b-PMMA22 | 60 | ST DVB | 148.5 1.5 | JD-5037XX | 150 | 0.071 | 38 ± 11 |
| Example 14 | PDMAEMA39-b-PMMA22 | 60 | ST DVB | 148.5 1.5 | JD-5040XX | 150 | 0.071 | 63 ± 11 |
| Example 15 | PDMAEMA39-b-PMMA22 | 60 | MMA | 150 | JD-5040XX | 150 | 0.074 | 70 ± 14 |
| Example 16 | PDMAEMA39-b-PMMA22 | 60 | MMA EGDMA | 142.5 7.5 | JD-5040XX | 150 | 0.074 | 70 ± 13 |
| Example 17 | PDMAEMA39-b-PMMA22 | 60 | MMA EGDMA | 135 15 | JD-5040XX | 150 | 0.074 | 66 ± 18 |

TABLE 5

| | Surfactant | | Monomer | | Liquid Crystal Material | | Initiator | |
|---|---|---|---|---|---|---|---|---|
| | Kind | Amount (mg) | Kind | Amount (mg) | Kind | Amount (mg) | VA-044 (mmol) | Average Particle Diameter nm |
| Example 18 | PDMAEMA39-b-PMMA22 | 60 | ST | 150 | JD-5039XX | 150 | 0.072 | 32 ± 9 |
| Example 19 | PDMAEMA39-b-PMMA22 | 60 | ST | 150 | JD-5041XX | 150 | 0.072 | 42 ± 11 |
| Example 20 | PDMAEMA43-b-PSt15 | 60 | ST | 150 | JD-5037XX | 150 | 0.072 | 36 ± 9 |
| Example 21 | PDMAEMA43-b-PSt15 | 60 | ST | 150 | JD-5041XX | 150 | 0.072 | 33 ± 9 |

MMA: Methyl methacrylate
DVB: Divinylbenzene
ST: Styrene
EGDMA: Ethyleneglycol dimethacrylate

Example 2

Preparation of a Liquid Crystal Capsule

Deionized water (1.5 g) was incorporated with a monomer (St: 150 mg) and a liquid crystal material (JD-5037XX: 150 mg) in a recovery flask, and Emulgen 109p (0.12 g) made by Kao Corporation was dissolved thereinto. Then, the reaction system was subjected to phase inversion emulsification from an oil phase to a water phase while the resulting mixture was stirred at 50° C., and then VA-044 (0.023 g) and deionized water (4.5 g) were added thereto, and the resulting mixture was degassed to start coacervation. The resulting mixture was stirred for 12 hours, and then immersed into an ice bath, and cooled to stop polymerization. Measurement of a particle diameter and calculation of an average particle diameter were performed in a manner similar to Example 1. The average particle diameter of the liquid crystal capsule obtained was 56±22 nm.

Comparative Example 1

Synperonic (registered trademark) F 108 (poly(ethylene glycol)-b-poly(propylene glycol)-b-poly(ethylene glycol)) (Sigma-Aldrich Co., LLC) (0.010 g) and PVA ($M_w$=13,000 to 23,000, 87 to 89% hydrolyzed) (0.010 g) were dissolved in deionized water (10 g), and a liquid crystal material (JD-5037XX) (0.50 g) was added thereto. The resulting mixture was irradiated with an ultrasonic wave to prepare an O/W type emulsion, and then the resulting emulsion was stirred at 60° C. for 4 hours to construct a capsule wall composed of PVA (poly(vinyl alcohol)) around a liquid crystal droplet. Glutaraldehyde (about 50% in water) (0.010 g) was added thereto, and the resulting mixture was stirred for 4 hours to cause crosslinking of an —OH moiety of the PVA capsule wall. Measurement of a particle diameter and calculation of an average particle diameter were performed in a manner similar to Example 1. The average particle diameter of the capsule obtained was 500 nm to 1 μm.

Comparative Example 2

A liquid crystal capsule was produced under conditions similar to Comparative Example 1 except that JD-5039XX was used as a liquid crystal material, and an average particle diameter of the capsule obtained was calculated. As a result, the average particle diameter of the capsule obtained was 500 nm to 2 μm.

Comparative Example 3

A liquid crystal capsule was produced under conditions similar to Comparative Example 1 except that JD-5040XX was used as a liquid crystal material, and an average particle diameter of the capsule obtained was calculated. As a result, the average particle diameter of the capsule obtained was 500 nm to 2 μm.

INDUSTRIAL APPLICABILITY

Specific examples of a method for utilizing the invention include a flexible display.

What is claimed is:

1. A method of forming a liquid crystal capsule comprising a liquid crystal composition inside a capsule wall, said method comprising the steps of:
   mixing the liquid crystal composition, a monomer having a polymerization group, a surfactant that is a block copolymer having a hydrophilic moiety and a hydrophobic group, and a polymerization initiator, wherein a water-in-oil emulsion is formed by the hydrophobic group of the block copolymer orienting outward and the hydrophilic moiety orienting inward, to form a mixed material;
   adding water to the mixed material to form an oil-in-water emulsion;
   adding water to the oil-in-water emulsion; and
   polymerizing the monomer to form a polymer which is the capsule wall wrapping the liquid crystal composition.

2. The method according to claim 1, wherein in the step of polymerizing the monomer, interfacial tension γ in the liquid crystal composition, the polymer, and water satisfies the following three expressions (a) to (c):

$$\gamma_{23}-(\gamma_{12}+\gamma_{13})<0 \quad (a);$$

$$\gamma_{13}-(\gamma_{12}+\gamma_{23})>0 \quad (b); \text{ and}$$

$$\gamma_{12}-(\gamma_{13}+\gamma_{23})<0 \quad (c),$$

where, in expressions (a) to (c), a subscript 1 represents the liquid crystal composition, a subscript 2 represents the polymer, a subscript 3 represents water, and $\gamma_{12}$, $\gamma_{13}$ and $\gamma_{23}$ are represented by the following equations:

$$\gamma_{12}=\gamma_1+\gamma_2-2(\gamma_1^d\gamma_2^d)^{1/2}-2(\gamma_1^h\gamma_2^h)^{1/2};$$

$$\gamma_{13}=\gamma_1+\gamma_3-2(\gamma_1^d\gamma_3^d)^{1/2}-2(\gamma_1^h\gamma_3^h)^{1/2}; \text{ and}$$

$$\gamma_{23}=\gamma_2+\gamma_3-2(\gamma_2^d\gamma_3^d)^{1/2}-2(\gamma_2^h\gamma_3^h)^{1/2},$$

where, each $\gamma_i$ (i is 1, 2 or 3) satisfies an equation: $\gamma_i=\gamma_i^d+\gamma_i^h$, wherein $\gamma_i^d$ represents a non-polar dispersion force component of $\gamma_i$, and $\gamma_i^h$ represents a polar hydrogen bonding component of $\gamma_i$.

3. The method according to claim 1, wherein the liquid crystal composition comprises liquid crystal component 1 composed of a compound represented by formula (1), and liquid crystal component 2 composed of a compound represented by formula (2), in which a proportion of a compound having cyano is less than 3% by weight based on the total of the liquid crystal composition:

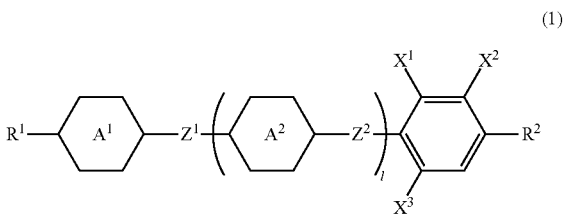

(1)

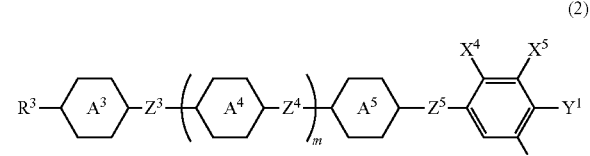

(2)

wherein, in formula (1) and formula (2), $R^1$, $R^2$ and $R^3$ are independently alkyl having 1 to 12 carbons, alkoxy having 1 to 12 carbons or alkenyl having 2 to 12 carbons; rings $A^1$, $A^2$, $A^3$, $A^4$ and $A^5$ are independently 1,4-cyclohexylene, 1,4-phenylene, 2-fluoro-1,4-phenylene, 2,5-difluoro-1,4-phenylene, 2,6-difluoro-1,4- phenylene, pyridine-2,5-diyl, pyrimidine-2,5-diyl, 1,3-dioxane-2,5-diyl or tetrahydropyran-2,5-diyl; $Z^1$, $Z^2$, $Z^3$, $Z^4$ and $Z^5$ are independently a single bond, ethylene, vinylene, methyleneoxy, carbonyloxy, difluoromethyleneoxy, tolan or tetrafluoroethylene, in which at least one of $Z^1$ and $Z^2$ is tolan; $X^1$, $X^2$, $X^3$, $X^4$, $X^5$ and $X^6$ are independently hydrogen or fluorine, in which a case where $X^1$ and $X^2$ are simultaneously fluorine is excluded, and a case where $X^4$ and $X^5$ are simultaneously fluorine is excluded; $Y^1$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; l and m are 0, 1 or 2, and when l and m are 2, a plurality of ring $A^2$, ring $A^4$, $Z^2$ and $Z^4$ existing therein may be identical to or different from each other.

4. A liquid crystal capsule, produced by the method according to claim 1.

5. The liquid crystal capsule according to claim 4, wherein a diameter of the liquid crystal capsule is 30 to 150 nanometers.

6. A liquid crystal device, comprising a set of substrates arranged facing each other, an electrode formed on one or the set of the substrates, the liquid crystal capsule according to claim 4, and an electric field application means for applying an electric field to the liquid crystal capsule through the electrode.

7. The liquid crystal device according to claim 6, wherein at least one of the substrates is transparent, and the liquid crystal device further comprises a polarizing plate arranged outside the at least one of the substrates.

* * * * *